(12) United States Patent
Boiger et al.

(10) Patent No.: US 10,180,178 B2
(45) Date of Patent: Jan. 15, 2019

(54) GEARBOX AND DRIVE ARRANGEMENT WITH A GEARBOX

(71) Applicant: RENK Aktiengesellschaft, Augsburg (DE)

(72) Inventors: Peter Boiger, Augsburg (DE); Burkhard Pinnekamp, Augsburg (DE)

(73) Assignee: RENK Aktiengesellschaft, Augsburg (DE)

( * ) Notice: Subject to any disclaimer, the term of this patent is extended or adjusted under 35 U.S.C. 154(b) by 155 days.

(21) Appl. No.: 15/148,453

(22) Filed: May 6, 2016

(65) Prior Publication Data

US 2016/0327134 A1    Nov. 10, 2016

(30) Foreign Application Priority Data

May 9, 2015    (DE) .................. 10 2015 006 084

(51) Int. Cl.
| | | |
|---|---|---|
| *F16H 3/48* | (2006.01) | |
| *F16H 3/72* | (2006.01) | |
| *F16H 3/44* | (2006.01) | |
| *F16H 1/28* | (2006.01) | |

(52) U.S. Cl.
CPC ............. *F16H 3/727* (2013.01); *F16H 3/724* (2013.01); *F16H 3/48* (2013.01); *F16H 2001/289* (2013.01); *F16H 2001/2881* (2013.01); *F16H 2003/442* (2013.01); *F16H 2200/2007* (2013.01)

(58) Field of Classification Search
CPC ....... F16H 2001/289; F16H 2001/2881; F16H 2003/442; F16H 3/48; F16H 3/727; F16H 3/724; F16H 2200/2007
USPC .................... 475/5, 150, 339, 340, 341, 342
See application file for complete search history.

(56) References Cited

U.S. PATENT DOCUMENTS

| | | | |
|---|---|---|---|
| 4,018,083 A | 4/1977 | Hoffman | |
| 6,595,884 B1* | 7/2003 | Ai ........................... | F16H 3/727 475/151 |
| 6,645,106 B2* | 11/2003 | Goo ......................... | F16H 3/72 475/340 |
| 6,645,112 B1* | 11/2003 | Fleytman ........... | B60K 17/3462 180/249 |
| 6,666,787 B2* | 12/2003 | Doepke .................. | B60K 6/365 475/343 |

(Continued)

FOREIGN PATENT DOCUMENTS

| | | |
|---|---|---|
| EP | 1 167 818 | 1/2002 |
| GB | 2429342 | 2/2007 |

OTHER PUBLICATIONS

Office Action dated Sep. 11, 2017 which issued in the corresponding Great Britain Application No. 1607696.0.

(Continued)

*Primary Examiner* — Roger L Pang
(74) *Attorney, Agent, or Firm* — Cozen O'Connor

(57) ABSTRACT

A gearbox for a drive arrangement of a machine for driving the machine with variably adjustable rotational speed, with a first planet gear set, to which a first drive unit can be coupled and a second planet gear set, to which the machine can be coupled. The first planet gear set and the second planet gear set each comprise planet gears arranged on at least two common planet shafts which are mounted in a planet carrier. The planet carrier is rotatably mounted in a gearbox housing and can be driven by a second drive unit.

6 Claims, 3 Drawing Sheets

(56) References Cited

U.S. PATENT DOCUMENTS

| | | | | |
|---|---|---|---|---|
| 6,994,646 | B2* | 2/2006 | Ai | B60K 6/365 |
| | | | | 475/5 |
| 8,376,885 | B2* | 2/2013 | Clauson | B60K 6/365 |
| | | | | 180/65.235 |
| 8,585,525 | B2* | 11/2013 | Ushiroda | B60K 1/02 |
| | | | | 180/65.6 |
| 2007/0129208 | A1* | 6/2007 | Willmot | B60K 6/36 |
| | | | | 475/339 |
| 2010/0132637 | A1 | 6/2010 | Barker | |
| 2017/0282702 | A1* | 10/2017 | Kim | B60K 6/445 |

OTHER PUBLICATIONS

Search and Examination Report dated Oct. 14, 2016 which issued in the corresponding Great Britain Patent Application No. 1607679.6.

\* cited by examiner

GEARBOX AND DRIVE ARRANGEMENT WITH A GEARBOX

BACKGROUND OF THE INVENTION

1. Field of the Invention

The invention relates to a gearbox for a drive arrangement of a machine for driving the machine with variably adjustable rotational speed and to a drive arrangement with a gearbox and a machine to be driven with a variably adjustable rotational speed.

2. Description of the Related Art

From practice, applications are known in which a machine such as a compressor or a pump have to be operated with a variably adjustable rotational speed. According to practice, either electric motors with frequency converters are employed as drive units or a gearbox with a hydraulically or electrically driven speed modulation branch is employed, with which a transmission that is variable in the required range can be provided. Both possibilities for driving a machine with variably adjustable rotational speed known from practice are involved and expensive because of the high power outputs required for the driving task, medium-voltage frequency converters are necessary.

SUMMARY OF THE INVENTION

Starting out from this, one aspect of the present invention is based on creating a new type of gearbox and a drive arrangement. According to one aspect of the invention, the gearbox comprises a first planet gear set, to which a first drive unit can be coupled and a second planet gear set to which the machine can be coupled. The first planet gear set and the second planet gear set each comprise planet gears which are arranged on at least two common planet shafts, mounted in a planet carrier. The planet carrier is rotatably mounted in a gearbox housing and driveable by a second drive unit. The gearbox according to the invention allows driving a machine with a variably adjustable rotational speed using simple and cost-effective elements.

In the case of the arrangement described here, the rotational speeds are between approximately 4000 and approximately 15000 rpm, while the drive rotational speeds are between approximately 1500 and approximately 3600 rpm.

In the past, the principle of speed modulation using planetary gears has included using the elements internal gear, planet carrier and sun pinion for driving or modulation and output. The known arrangements are performance-limited with respect to the technical limits of internal gear diameters since large internal gear diameters result in impermissible tangential loads.

Preferentially, the first planet gear set comprises a sun gear to which the first drive unit can be coupled, wherein the sun gear of the first planet gear set meshes with the planet gears of the first planet gear set arranged on the planet shafts. Alternatively, the first drive unit can be coupled to an internal gear of the first planet gear set, which meshes with the planet gears of the first planet gear set that is arranged on the planet shafts. The second gear set also comprises a sun gear to which the machine can be coupled, wherein the sun gear of the second planet gear set meshes with the planet gears of the second planet gear set arranged on the planet shafts. Such a configuration of the gearbox is simple and allows driving a machine with a variably adjustable rotational speed. Here, the torque in the modulation (second drive unit) is only generated by the difference of drive and output torque.

The drive arrangement according to one aspect of the invention comprises a gearbox according to the invention, a first drive unit that is coupled to the first planet gear set of the gearbox, a machine that is coupled to the second gear set of the gearbox, a second drive unit that is coupled to the planet carrier of the gearbox, the rotational speed of which can be superimposed on a rotational speed that is dependent on the rotational speed of the first drive unit, wherein the first drive unit and/or the second drive unit can be driven with variably adjustable rotational speed. Such a drive arrangement, which comprises the two drive units, the gearbox and the machine, allows driving the machine with variably adjustable rotational speed using simple and cost-effective elements. For the second drive unit, a low-voltage motor with inverter can be used, which only has a fraction of the power of the first drive.

Preferentially, the first drive unit is or will be operated with constant rotational speed and the second drive unit driveable or driven with variable rotational speed. This embodiment is particularly preferred for driving a machine with variably adjustable rotational speed.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail with the help of the drawing without being restricted to this. There it shows:

DETAILED DESCRIPTION OF THE PRESENTLY PREFERRED EMBODIMENTS

The invention relates to a gearbox for a drive arrangement of a machine for driving the machine with variably adjustable rotational speed. The invention, furthermore, relates to a drive arrangement of a machine to be driven with a variably adjustable rotational speed.

Figure 1:
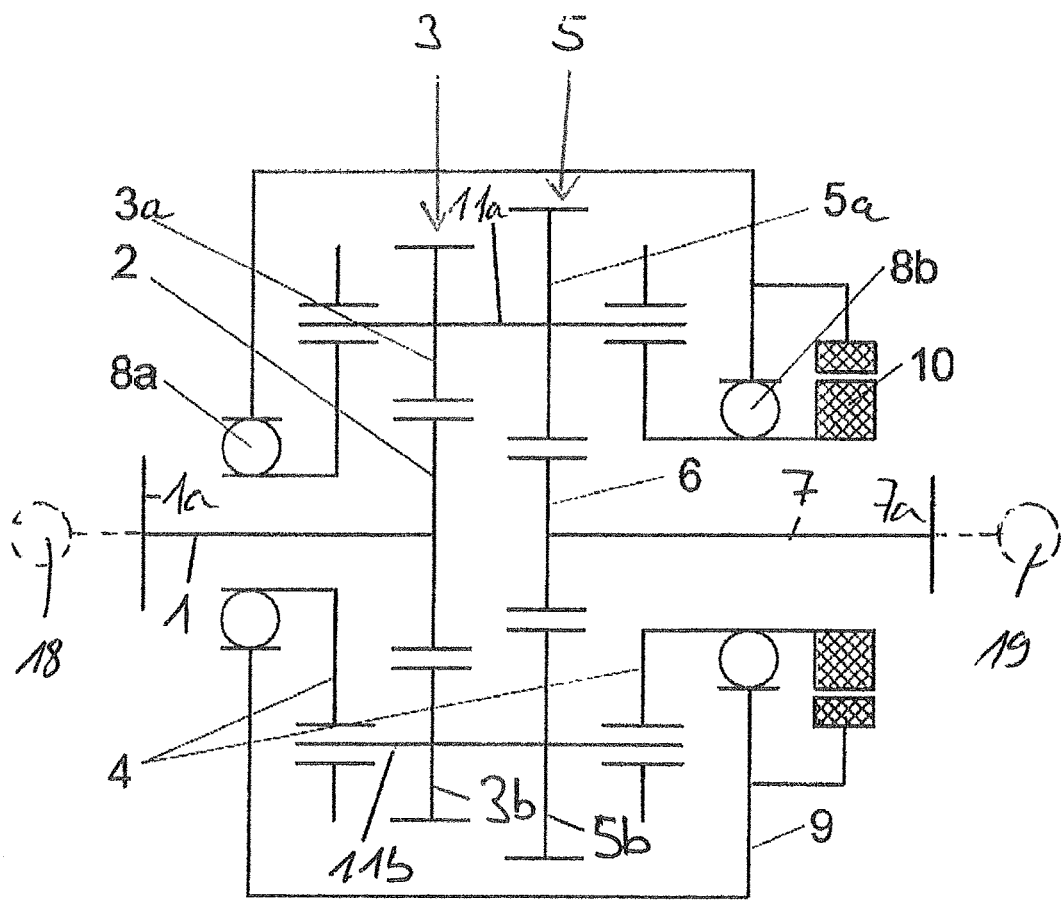
FIG. 1 is a block diagram of a first gearbox or a corresponding drive arrangement.

FIG. 1 shows a preferred exemplary embodiment of a gearbox or of a drive arrangement for a machine for driving the machine with variably adjustable rotational speed.

The gearbox of FIG. 1 comprises a first planet gear set 3, wherein to the first planet gear set 3 a shaft 1 of the gearbox is directly coupled. To the shaft 1, which is coupled to the first planet gear set 3, a first drive unit 18 can be directly coupled, in particular by way of a shaft flange 1a of shaft 1.

Furthermore, the gearbox 1 of FIG. 1 comprises a second planet gear set 5. The second planet gear set 5 is directly coupled to a further shaft 7 of the gearbox 1. To this shaft 7, in particular to a shaft flange 7a of the shaft 7, the machine 19 to be driven with variably adjustable rotational speed can be directly coupled.

The first planet gear set 3 and the second planet gear set 5 each comprise planet gears 3a, 3b and 5a, 5b respectively, which are arranged on at least two common planet shafts 11a, 11b. Accordingly, two planet shafts 11a, 11b are shown in FIG. 1, wherein on the planet shaft 11a the planet gears 3a and 5a of the planet gear sets 3, 5 and on the planet shaft 11b the planet gears 3b, 5b of the planet gear sets 3, 5 are arranged. It is pointed out that more than two such planet shafts 11a, 11b, with planet gears arranged on the same can also be present, for example three or four planet shafts with corresponding planet gears.

The planet shafts 11a, 11b are rotatably mounted in a planet carrier 4. The planet carrier 4 is not fixed to the housing, the planet carrier 4 according to the invention is rather rotatably mounted in a gearbox housing 9, wherein FIG. 1 shows rolling bearings 8a, 8b, via which the planet carrier 4 is rotatably mounted in the planet housing 9. The planet carrier 4 is driveable via a second drive unit 10.

In the exemplary embodiment of FIG. 1, the first drive unit 18, which via the shaft flange 1a directly acts on the shaft 1 of the gearbox, can be directly coupled to a sun gear 2 of the first planet gear set 3 via the shaft 1. This first drive unit 18, via the sun gear 2, drives the planet gears 3a, 3b of the first planet gear set 3 arranged on the planet shafts 11a, 11b.

Because of this, the planet shafts 11a, 11b and thus also the planet gears 5a, 5b of the second planet gear set 5 are driven. The second planet gear set 5 comprises a sun gear 6 driven via the planet gears 5a, 5b of the second planet gear set 5. This sun gear 6 of the second planet gear set 5 is coupled to the shaft 7 and via the shaft 7 to the machine 19 which is to be driven with variably adjustable rotational speed.

In FIG. 1, the planet gears 3a, 3b of the first planet gear set 3 mesh with the sun gear 2 of the first planet gear set 3, whereas the planet gears 5a, 5b of the second planet gear set 5 mesh with the sun gear 6 of the second planet gear set 5. With a drive arrangement, in which the gearbox shown in FIG. 1 is employed, the first drive unit 18 accordingly acts on the shaft 1, the second drive unit 10 acts on the planet carrier 4, the machine 19 to be driven with variably adjustable rotational speed acts on the shaft 7.

The first drive unit 18, which acts on the shaft 1, preferentially is a drive unit to be driven with constant rotational speed. The second drive unit 10, which acts on the planet carrier 4, preferentially is a drive unit to be driven with variably rotational speed. This first drive unit 18 in FIG. 1, via the sun gear 2 of the first planet gear set 3, drives the planet gears 3a, 3b and thus the planet shafts 11a, 11b, with which the planet gears 3a, 3b are connected in a rotationally fixed manner. Likewise, the planet gears 5a, 5b of the second planet gear set 5 are connected to the planet shafts 11a, 11b in a rotationally fixed manner, which in turn drive the sun gear 6 of the second planet gear set 5 in order to ultimately provide the part of the drive power that is provided by the first drive unit 18 to the machine 19 to be driven with variable rotational speed.

As already explained, the planet shafts 11a, 11b are mounted in the planet carrier. The planet carrier 4 in this case is rotatably mounted and thus driveable in the gearbox housing 9 by way of rolling bearings 8a, 8b. The drive of the planet carrier 4 is effected via the second drive unit 10, the rotational speed or drive power of which is superimposed on the rotational speed or drive power of the first drive unit 18 acting on the shaft 1. As already explained, the first drive unit 18, which acts on the shaft 1, is preferentially driven with fixed or constant rotational speed, whereas the second drive unit 10, which acts on the planet carrier 4, is preferentially driven with variable rotational speed.

Both drive units 18, 10 are preferentially electric motors.

In the exemplary embodiment of FIG. 1, the second drive unit 10 is embodied as a hollow shaft motor, which is directly attached to the planet carrier 4.

Between the second drive unit 10 and the planet carrier 4, a transmission stage can also be connected.

Figure 2:
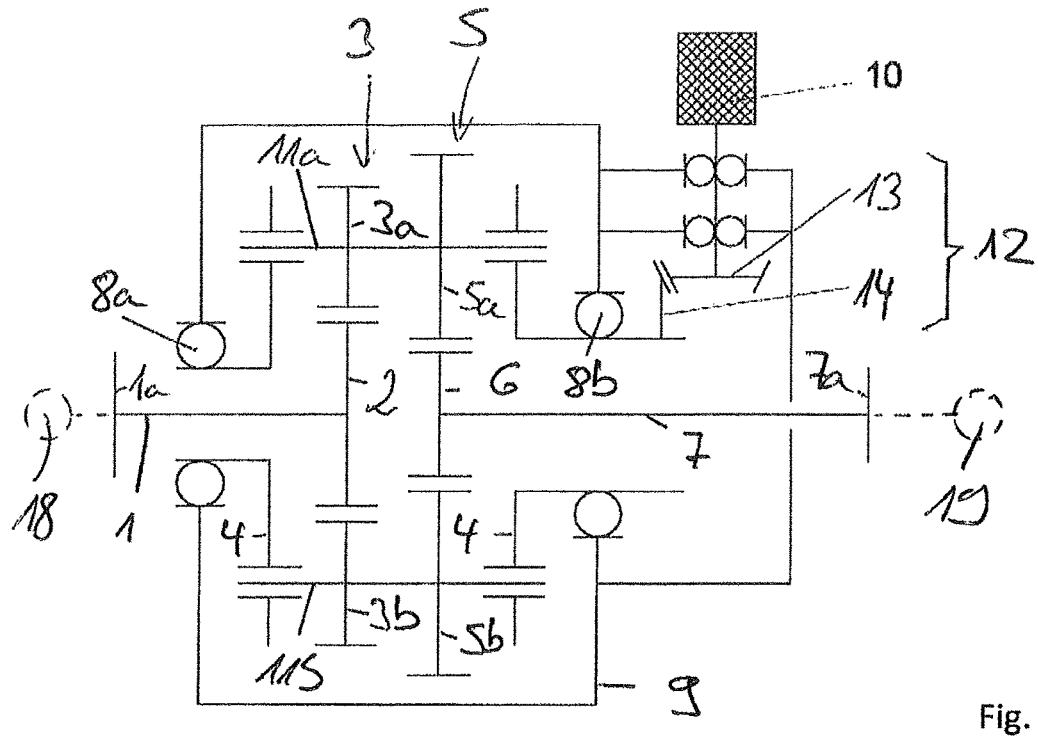
FIG. 2 is a block diagram of a second gearbox or a corresponding drive arrangement.

Accordingly, FIG. 2 shows a modification of the gearbox or the drive arrangement of FIG. 1, in which the second drive unit 10 is coupled via a bevel gear stage 12 to the planet carrier 4 of the gearbox 1, wherein the bevel gear stage 12 comprises a bevel gear 14 and a bevel pinion shaft 13.

Figure 3:
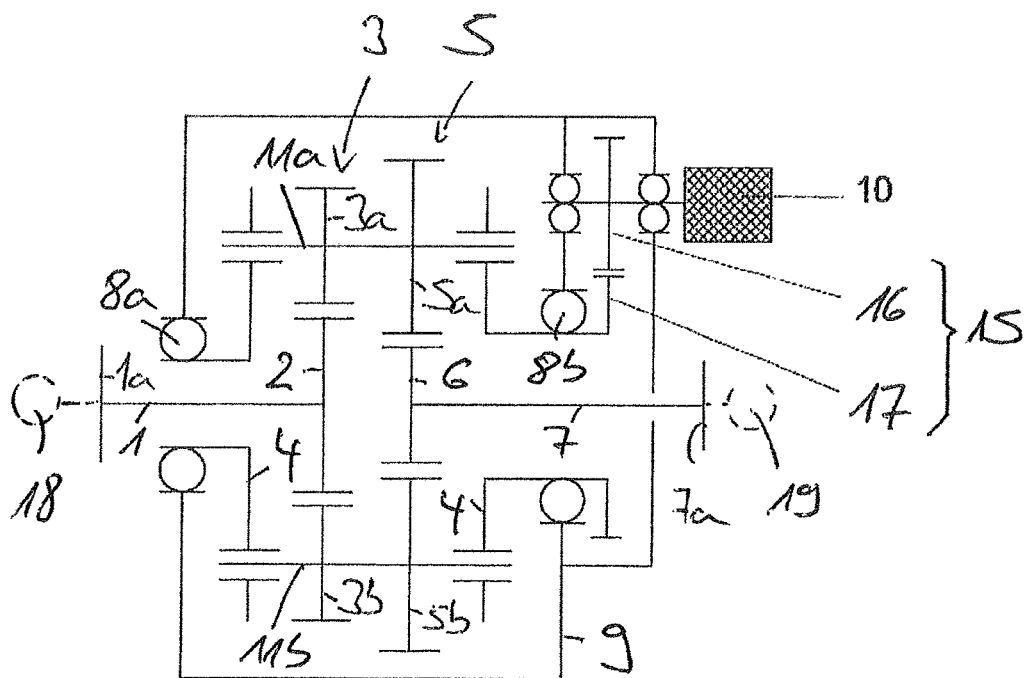
FIG. 3 is a block diagram of a third gearbox or a corresponding drive arrangement.

FIG. 3 shows a further modification of the gearbox or of the drive arrangement in which the second drive unit 10 is coupled to the planet carrier 4 of the gearbox via a spur gear stage with spur gear 17 and pinion shaft 16, in order to drive the same.

As already explained, the rotational speed of the planet carrier 4 is variably adjustable via the second drive unit 10, as a result of which an output rotational speed that is variably adjustable in a range is achieved on the shaft 7 for driving the machine 19, namely by superimposing the rotational speed or drive power of the second drive unit 10 with or by the rotational speed or drive power of the rotational speed or drive power provided by the first drive unit 18 on the shaft 1. The second drive unit can be operated as motor and also as generator or in a combination of these.

Figure 4:
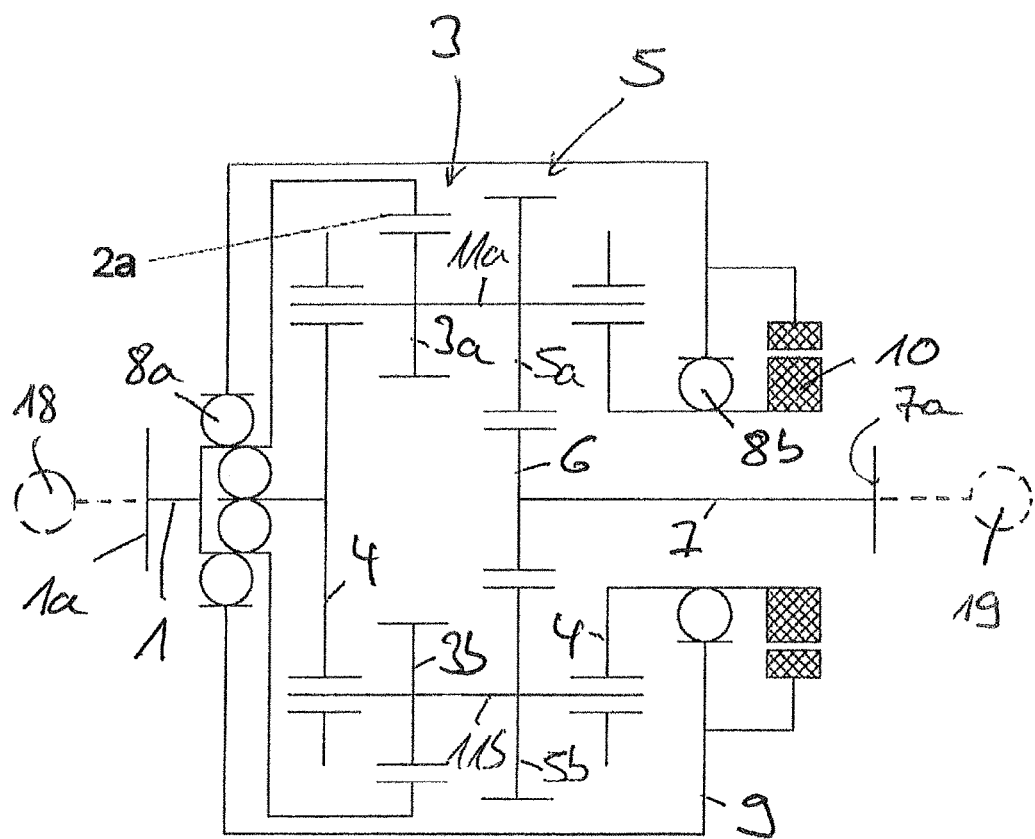
FIG. 4 is a block diagram of a gearbox or a corresponding drive arrangement.

A further version of a gearbox according to the invention is shown in FIG. 4, wherein the exemplary embodiment of FIG. 4 differs from the embodiment of FIG. 1 in that the drive power provided by the first drive unit 18 on the shaft 1 drives the planet gears 3a, 3b of the first planet gear set 3 not via a sun gear but rather via an internal gear 2a of the first planet gear set 3. With respect to all other details, the exemplary embodiment of FIG. 4 corresponds to the exemplary embodiment of FIG. 1.

Although not shown, a transmission stage in the form of a bevel gear stage 12 or spur gear stage 15 can also be connected between the second drive unit 10 and the planet carrier 4 corresponding to the exemplary embodiments of FIGS. 2 and 3.

The gearboxes according to the invention are embodied as speed modulation gearboxes. The shown gearboxes are each differential gearboxes with two planet gear sets 3, 5, wherein the gearbox is connected between two drive units 18, 10 and a machine 19 in order to drive the machine 19 with a variably adjustable rotational speed. One of the drive units is drive with constant rotational speed and the other drive unit with variable rotational speed. Although not preferred, it is also possible to embody both drive units with variably adjustable rotational speed.

In the shown exemplary embodiments, the first drive unit 18 either drives the planet gears 3a, 3b of the first planet gear stage 3 via a sun gear 2 or an internal gear 2a. The second drive unit 10 in each case drives the planet carrier 4 that is rotatably mounted in the housing 9. The output is effected via the second planet gear set 5 of the gearbox towards the machine 19.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A gearbox for a drive arrangement of a machine configured to drive the machine with variably adjustable rotational speed, comprising:
    a gearbox housing;
    a planet carrier rotatably mounted in the gearbox housing and configured to be driven by a second drive unit;
    at least two common planet shafts mounted in the planet carrier;
    a first planet gear set configured to be coupled to a first drive unit that is configured as an electric motor; and
    a second planet gear set configured to be coupled directly to the machine by a first sun gear of the second planet gear set;
    wherein the first planet gear set and the second planet gear set each comprise respective planet gears arranged on the at least two common planet shafts,
    wherein the second drive unit comprises a hollow shaft motor which is directly attached to rotate with the planet carrier, and
    wherein the first drive unit is driveable with constant rotational speed, and the second drive unit is driveable with variably adjustable rotational speed.

2. The gearbox according to claim 1,
    wherein a first sun gear of the first planet gear set meshes with the planet gears of the first planet gear set arranged on the at least two common planet shafts.

3. The gearbox according to claim 1,
    wherein the first planet gear set comprises a first internal gear configured to be coupled to the first drive unit, wherein the first internal gear of the first planet gear set meshes with the planet gears of the first planet gear set.

4. The gearbox according to claim 1,
    wherein the first sun gear of the second planet gear set meshes with the planet gears of the second planet gear set.

5. The gearbox according to claim 2,
    wherein the first sun gear of the second planet gear set meshes with the planet gears of the second planet gear set.

6. A drive arrangement, comprising:
    a gearbox comprising:
        a gearbox housing;
        a planet carrier rotatably mounted in the gearbox housing;
        at least two common planet shafts mounted in the planet carrier;
        a first planet gear set; and
        a second planet gear set having a sun gear;
        wherein the first planet gear set and the second planet gear set each comprise respective planet gears arranged on the at least two common planet shafts;
        a first drive unit configured as an electric motor and coupled to the first planet gear set via a shaft;
    a machine configured to be driven with a variably adjustable speed and directly coupled to the second planet gear set by the first sun gear of the second planet gear set;
    a second drive unit coupled to the planet carrier, a rotational speed of the second drive unit is superimposed on a rotational speed dependent on a rotational speed of the first drive unit,
    wherein the second drive unit comprises a hollow shaft motor which is directly attached to rotate with the planet carrier,
    wherein the second drive unit is configured to drive the planet carrier with a first variably adjustable rotational speed,
    wherein the first drive unit is configured to drive the shaft with a second constant rotational speed, and
    wherein the drive arrangement is configured to superimpose the first rotational speed on the second rotational speed.

* * * * *